(12) United States Patent
Dreier et al.

(10) Patent No.: US 7,818,140 B2
(45) Date of Patent: Oct. 19, 2010

(54) SYSTEM FOR ESTIMATING A VEHICLE MASS

(75) Inventors: Loren Christopher Dreier, Southern Pines, NC (US); Ingo-Gerd Sauter, Aberdeen, NC (US)

(73) Assignee: ZF Friedrichshafen AG, Friedrichshafen (DE)

(*) Notice: Subject to any disclaimer, the term of this patent is extended or adjusted under 35 U.S.C. 154(b) by 52 days.

(21) Appl. No.: 12/021,972

(22) Filed: Jan. 29, 2008

(65) Prior Publication Data

US 2009/0192760 A1 Jul. 30, 2009

(51) Int. Cl.
*G01G 7/00* (2006.01)
*G01G 19/08* (2006.01)
*G06F 17/00* (2006.01)

(52) U.S. Cl. .................. 702/173; 177/136; 701/124

(58) Field of Classification Search ............ 702/127, 702/173–175, 33, 41, 44, 57, 60, 62, 64–65, 702/81, 84, 101–102, 105, 182, 188–189; 73/865; 477/34, 900; 177/1, 3–6, 26, 9, 177/13, 25.11–25.13, 25.19, 136–139, 145–149, 177/153; 74/11, 640; 701/51, 124
See application file for complete search history.

(56) References Cited

U.S. PATENT DOCUMENTS

| | | | | | |
|---|---|---|---|---|---|
| 4,548,079 | A | * | 10/1985 | Klatt ............................ | 73/865 |
| 4,656,876 | A | * | 4/1987 | Fremd .......................... | 73/865 |
| 4,706,768 | A | * | 11/1987 | Kozozian et al. ............ | 177/138 |
| 4,839,835 | A | * | 6/1989 | Hagenbuch .................. | 702/174 |
| 4,941,365 | A | * | 7/1990 | Reiner et al. ................. | 73/865 |
| 5,272,939 | A | | 12/1993 | Markyvech et al. ......... | 477/120 |
| 5,335,566 | A | | 8/1994 | Genise et al. ................ | 477/124 |
| 5,482,359 | A | * | 1/1996 | Breen .......................... | 303/9.69 |
| 5,490,063 | A | * | 2/1996 | Genise .......................... | 701/1 |
| 5,877,455 | A | | 3/1999 | Kyrtsos ........................ | 177/1 |
| 5,970,435 | A | | 10/1999 | Ito ............................... | 702/173 |
| 6,037,550 | A | | 3/2000 | Bradley ....................... | 177/136 |
| 6,118,083 | A | | 9/2000 | Boyovich et al. ........... | 177/136 |
| 6,149,545 | A | | 11/2000 | Genise et al. ................ | 477/124 |
| 6,167,357 | A | * | 12/2000 | Zhu et al. .................... | 702/175 |
| 6,339,749 | B1 | | 1/2002 | Rieker et al. ................ | 702/173 |
| 6,438,510 | B2 | * | 8/2002 | Zhu et al. .................... | 702/175 |
| 6,449,582 | B1 | | 9/2002 | Chaklader ................... | 702/173 |
| 6,567,734 | B2 | * | 5/2003 | Bellinger et al. ............ | 701/51 |
| 6,633,006 | B1 | | 10/2003 | Wolf et al. ................ | 177/25.13 |
| 6,655,222 | B2 | | 12/2003 | Hessmert et al. ............ | 73/865 |
| 6,803,530 | B2 | * | 10/2004 | Carlstrom et al. ........... | 177/136 |
| 6,980,900 | B2 | | 12/2005 | Grieser ........................ | 701/70 |
| 7,039,519 | B2 | | 5/2006 | Ishiguro et al. ............. | 701/124 |
| 7,141,746 | B1 | | 11/2006 | Scott ........................... | 177/137 |
| 7,430,491 | B2 | * | 9/2008 | Gutierrez et al. ............ | 702/175 |
| 2001/0001138 | A1 | | 5/2001 | Zhu et al. .................... | 702/175 |

(Continued)

*Primary Examiner*—Edward R Cosimano
*Assistant Examiner*—Toan M Le
(74) *Attorney, Agent, or Firm*—Brinks Hofer Gilson & Lione

(57) ABSTRACT

A vehicle mass estimation system for use in a vehicle, such as a truck, including a transmission is provided. A processor may be operable to receive a signal relating to a mass of at least a portion of the vehicle. The processor may be further operable to estimate a vehicle mass based, at least in part, on the signal. The processor may be further operable to select a desired gear ratio for engagement in a transmission based, at least in part, on the estimated vehicle mass.

20 Claims, 6 Drawing Sheets

U.S. PATENT DOCUMENTS

| | | |
|---|---|---|
| 2002/0091481 A1 | 7/2002 | Hessmert et al. ............ 701/124 |
| 2003/0014214 A1 | 1/2003 | Zefira ........................ 702/173 |
| 2003/0040861 A1 | 2/2003 | Bellinger et al. .............. 701/51 |
| 2003/0040885 A1 | 2/2003 | Schoess et al. ............. 702/173 |
| 2003/0154798 A1 | 8/2003 | Weyand et al. ................ 73/760 |
| 2004/0025617 A1 | 2/2004 | Fowler et al. ............ 74/473.12 |
| 2004/0181317 A1 | 9/2004 | Flechtner et al. ................ 701/1 |
| 2005/0010356 A1 | 1/2005 | Ishiguro et al. ............. 701/124 |
| 2005/0065695 A1 | 3/2005 | Grieser ........................ 701/70 |
| 2005/0081649 A1 | 4/2005 | Takahashi ............... 73/862.474 |
| 2005/0246256 A1 | 11/2005 | Gastineau et al. ........... 320/103 |
| 2006/0108154 A1 | 5/2006 | Mack et al. ................. 177/136 |
| 2006/0149424 A1 | 7/2006 | Hecker et al. ............... 702/175 |

* cited by examiner

SYSTEM FOR ESTIMATING A VEHICLE MASS

FIELD OF THE INVENTION

This invention relates to vehicle systems, specifically to such systems used for estimating a mass of a vehicle.

BACKGROUND

Vehicles utilizing automatic or automated mechanical transmissions (also referred to as automated manual transmissions), such as trucks, buses, and cars, depend on gear shifting logic or algorithms to determine the appropriate gear to use for a wide variety of conditions. Each shift decision may be based on a balance between fuel efficiency and performance to provide a desired driving experience. One of the significant parameters impacting this balance is the total mass or weight of the vehicle. For example, a truck carrying no payload may shift to a higher gear by skipping one or more gears to improve fuel efficiency and yet still maintain an adequate level of performance. However, a truck carrying a relatively heavy payload may up-shift through each gear and engage each gear for a longer period of time to improve performance by transmitting an increased amount of power from the engine.

Some systems rely on the equation for Newton's second law of motion, force=mass×acceleration, to calculate a vehicle's mass or weight for use in a shifting algorithm. For example, the force is related to the engine torque, which propels the vehicle. When the engine torque is known, the vehicle mass may be derived through a calculation based on the vehicle's acceleration. A system may repeat the calculation several times to provide a mass or weight value with a better accuracy.

However, the vehicle must be in motion for this mass determination method to work because it requires measurement of a useful acceleration value. Also, this method typically uses an average of several calculations, and a single inaccurate calculation may adversely impact the mass or weight value. Furthermore, collecting and averaging several calculations takes time during which shifting performance may be negatively affected.

BRIEF SUMMARY

According to a first aspect, a vehicle mass estimation system for use in a vehicle including a tractor, a trailer, and a transmission is provided. A signal device may be operable to generate an indication signal. A processor may be operable to communicate with the signal device and operable to receive the indication signal from the signal device. The processor may be further operable to determine whether a vehicle trailer is connected to the vehicle tractor based on the indication signal. The processor may be further operable to estimate a vehicle mass based, at least in part, on the indication signal. The processor may be further operable to select a desired gear ratio for engagement in a transmission based, at least in part, on the estimated vehicle mass.

According to a second aspect, a vehicle mass estimation system for use in a vehicle including a tractor, a trailer, and a transmission is provided. A processor in a vehicle may be operable to communicate with a remote station. The remote station may be operable to transmit a mass signal indicative of the mass of at least a portion of the vehicle. The processor may be further operable to receive the mass signal. The processor may be further operable to select a desired gear ratio for engagement in the transmission based, at least in part, on the mass signal.

According to a third aspect, a vehicle mass estimation system for use in a vehicle including a tractor, a trailer, and a transmission is provided. An input device on or in a vehicle may be operable to receive an input from an operator and to generate a first mass signal. The input may be indicative of a mass of at least a portion of the vehicle. A processor may be operable to communicate with the input device and operable to receive the first mass signal from the input device. The processor may be further operable to estimate the vehicle mass based, at least in part, on the first mass signal. The processor may be further operable to select a desired gear ratio for engagement in the transmission based, at least in part, on the estimated vehicle mass.

According to a fourth aspect, a method of estimating a vehicle mass is provided. An indication signal may be received. Whether a vehicle trailer is connected to a vehicle tractor may be determined based on the indication signal. A vehicle mass may be estimated based, at least in part, on the indication signal. A desired gear ratio for engagement in a transmission may be selected based, at least in part, on the estimated vehicle mass.

According to a fifth aspect, a method of estimating a vehicle mass is provided. A mass signal may be received from a remote station. The mass signal may be indicative of a mass of at least a portion of a vehicle. A desired gear ratio for engagement in a transmission may be selected based, at least in part, on the mass signal.

According to a sixth aspect, a method of estimating a vehicle mass is provided. An input may be received from an operator. The input may be indicative of a mass of at least a portion of the vehicle. A first mass signal may be generated based on the input. A vehicle mass may be estimated based, at least in part, on the first mass signal. A desired gear ratio for engagement in a transmission may be selected based, at least in part, on the estimated mass.

Other systems, methods, features and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

Figure 1:
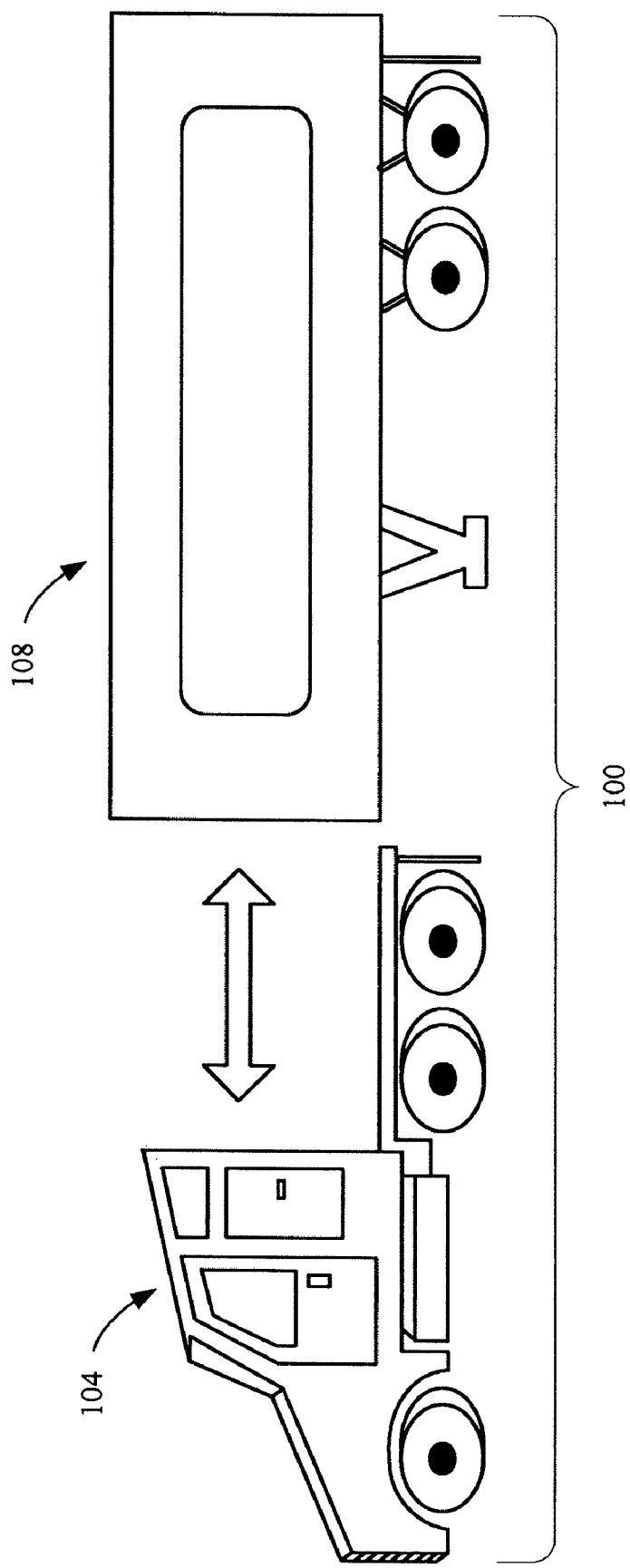
FIG. 1 is a two-dimensional drawing illustrating a basic structure of a vehicle.

FIG. 1 is a two-dimensional drawing illustrating a basic structure of a vehicle 100. The vehicle 100 may be a car, bus, truck, or any other known or future vehicle that utilizes an automatic or automated mechanical transmission. For example, the vehicle 100 may be a semi-trailer truck or any other vehicle including a vehicle tractor 104 and a vehicle trailer 108. Alternatively, the vehicle 100 may comprise only the vehicle tractor 104.

The vehicle tractor 104 may include, but is not limited to, a cab, a door for entering and exiting the cab, windows, seats for a driver, operator, and/or passenger, an engine, a transmission, a front or steer axle having two wheels, and two rear drive axles having double wheels on each side. Alternatively, the tractor 104 may have a single drive axle (known as a "six wheeler") used to pull shorter trailers.

The vehicle trailer 108 may include, but is not limited to, two tandem axles at the rear, and each of the axles may include dual wheels on each side (eight wheels on the trailer). The trailer 108 may comprise a box trailer, a cement trailer, a reefer trailer, a tanker trailer, a dry bulk trailer, a flatbed trailer, a lowboy trailer, or any known or future trailer.

Figure 2:
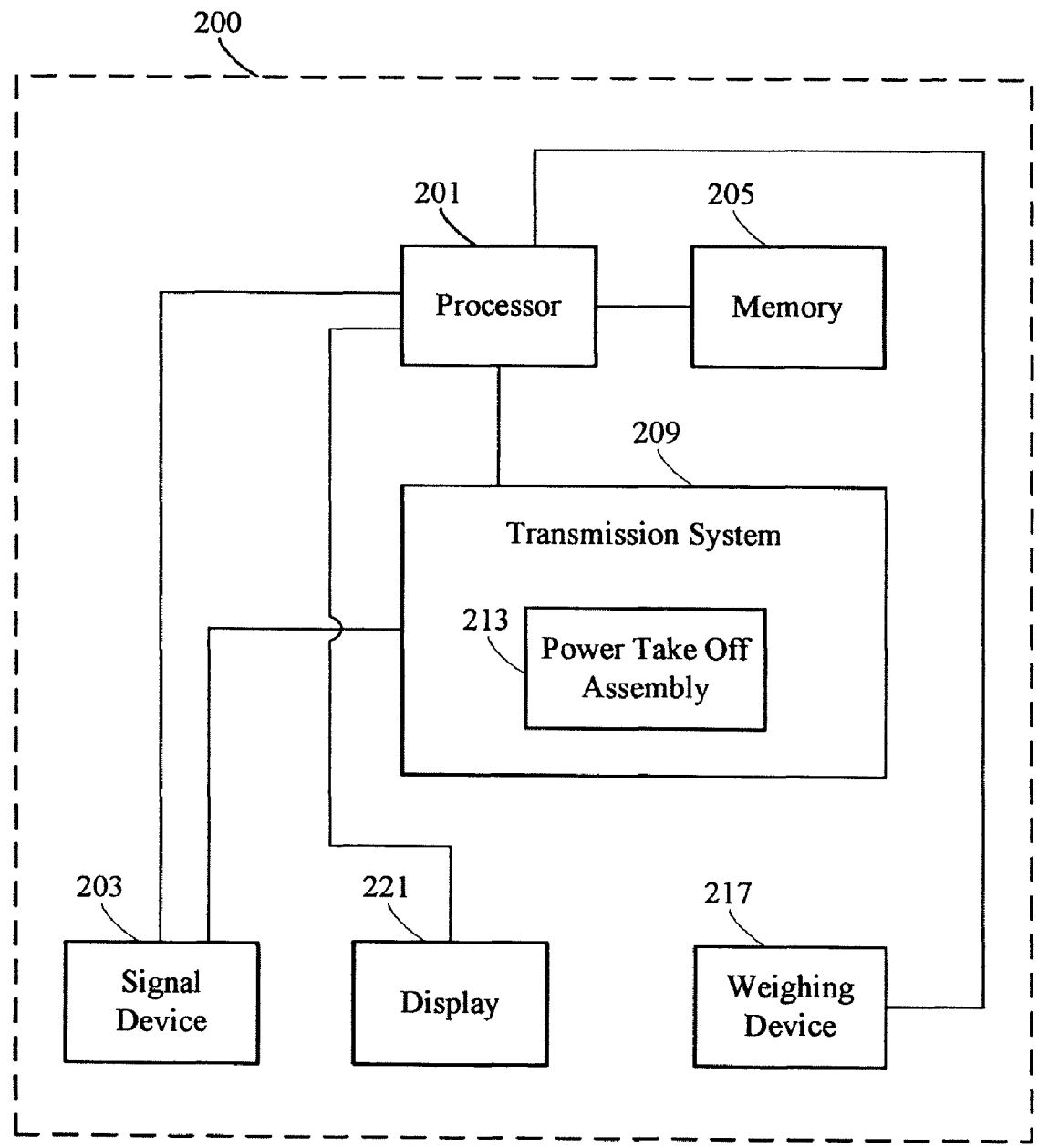
FIG. 2 is a diagram illustrating an exemplary embodiment of a vehicle mass estimation system.

FIG. 2 is a diagram illustrating an exemplary embodiment of a vehicle mass estimation system. The vehicle mass estimation system may be in or on a vehicle 200, such as the vehicle 100 previously described. For example, any number of or all the components of the vehicle mass estimation system may be in or on a vehicle tractor, such as the vehicle tractor 104, or any number of or all the components of the vehicle mass estimation system may be in or on a vehicle trailer, such as the vehicle trailer 108. The vehicle mass estimation system may include, but is not limited to, a transmission system 209, a power take-off assembly 213, a memory 205, a processor 201, a signal device 203, a weighing device 217, and a display 221.

The transmission system 209 may include, but is not limited to, a transmission, such as an automatic or automated mechanical transmission, one or more sensors, at least one transmission controller, and the power take-off assembly 213. The power-take off ("PTO") assembly 213 may include, but is not limited to, a PTO component, such as a gear or shaft, that may engage with the transmission to provide power for any variety of PTO operations. For example, when an engine is providing power to the transmission, a PTO component may be driven by a gear or shaft of the transmission. Consequently, the PTO component may provide power or energy to a pump, a generator, a ladder, a gear or pulley system, or any known or future mechanical, fluid, and/or electrical system. Any PTO component of the PTO assembly 213 may be in or on the vehicle tractor and/or the vehicle trailer. Alternatively, the PTO assembly 213 and a respective PTO component may be on a vehicle not associated with a trailer, such as a fire engine or other non-trailer vehicle.

The memory 205 may be a "computer-readable medium," "machine-readable medium," "propagated-signal" medium, and/or "signal-bearing medium" and may comprise any device that contains, stores, communicates, propagates, or transports software, data, and/or predetermined values indicative of one or more vehicle trailer masses or weights for use by or in connection with an instruction executable system, apparatus, or device. The memory 205 may be in any part of the vehicle 200. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The processor 201 may be in communication with or operable to communicate with the memory 205, the transmission system 209, the signal device 203, the weighing device 217, and the display 221. The processor 201 may be in communication with any other component of the vehicle 200. The processor 201 may be in any part of the vehicle 200. The processor 201 may be a main processor or a plurality of processors operable to communicate with electronics and controllers of the vehicle 200. For example, the processor 201 may be part of a public or private communications area network ("CAN"). The processor 201 may utilize a public electronic communication protocol, such as SAE J 1939 or SAE J 1587, and/or may utilize a proprietary electronic communication protocol or any other type of public or private communication technique. Also, the processor 201 may be able to determine whether a vehicle trailer is connected to a vehicle tractor based on an indication signal. Additionally, the processor 201 may be operable to estimate a vehicle mass or weight (hereinafter "mass or weight" will be referred to as "mass") at least in part on the indication signal, and the processor 201 may be operable to select a desired gear ratio for engagement in a transmission based, at least in part, on the estimated vehicle mass.

The signal device 203 may be in communication with the transmission system 209 and may be operable to communicate with the processor 201. The signal device 203 may be a mechanical and/or electrical sensor or a plurality of sensors operable to detect contact of a vehicle trailer, such as the vehicle trailer 108, with a vehicle tractor, such as the vehicle tractor 104. Alternatively, the signal device 203 may be a voltage or current supply or a processor on or in the vehicle tractor or trailer.

For example, the signal device 203 may be on a tractor bed or any other part of the vehicle tractor, and when the vehicle trailer is physically attached to the vehicle tractor, the signal device 203 may sense the attachment by a mechanical and/or electrical contact and transmit an indication signal to the processor 201. Alternatively, when the vehicle trailer comes into contact with the vehicle trailer, the signal device may transmit an alternating or direct current ("AC" or "DC") and/or voltage as an indication signal directly or indirectly to the processor 201. The indication signal may be a digital or analog signal. The signal device may transmit the indication signal to the processor 201 through electrical wires or traces or it may transmit the indication signal wirelessly. The indication signal may also be a MID137 signal. Trailers manufactured after 2001 may be equipped with the ability to broadcast a MID137 signal, which may be used to identify that the trailer has been added, on the vehicle's computer communications network. Alternatively, the indication signal may contain information or data that indicates what type of trailer is being attached, what the mass or weight of the trailer is, what type of payload the trailer is carrying, and/or the amount of payload the trailer is carrying.

For example, when a vehicle trailer is attached to a vehicle tractor, the signal device 203 may transmit the indication signal to the processor 201. As previously mentioned, the indication signal may be a low or high AC or DC signal or a MID137 signal. Based on the presence or lack of presence of the signal, the processor 201 may determine whether the vehicle trailer is attached or not. If the vehicle trailer is not attached, a predetermined value of the mass of the vehicle tractor, which may be stored in the memory 205, may be used in a shifting logic or algorithm to select a desired gear ratio for engagement in a transmission based on the vehicle tractor mass.

If the vehicle trailer is attached, the processor 201 may retrieve a predetermined value of the mass of the vehicle trailer from the memory 205, such as a mass signal representing the value of the mass of the vehicle trailer. The "value of the mass" may be an estimation, calculation, or measurement of mass that may or may not be equal to an actual mass. The predetermined value of the mass of the vehicle trailer may be used to estimate a total mass of the vehicle 200. A desired gear ratio is selected for engagement in a transmission based, at least in part, on the estimated vehicle mass. Alternatively, the processor 201 may retrieve a predetermined value of the mass of the whole vehicle 200 from the memory 205.

The indication signal may include one or more data indicative of a type of the vehicle trailer, whether the vehicle trailer is carrying a payload, and/or the amount of payload in or on the vehicle trailer. For example, the memory 205 may store data concerning the mass of the vehicle 200 and or the vehicle trailer based on the type of trailer, the amount of payload in or on the trailer, and/or the material or physical properties of the payload. For example, if a tanker full of petroleum is attached to a vehicle tractor, the processor 201 may intelligently retrieve a specific mass value for the vehicle trailer and/or the vehicle 200 based on the criteria that the trailer is a tanker, the tanker is full, and the tanker is carrying petroleum. If an empty lowboy is attached to the vehicle tractor, the processor 201 may intelligently retrieve a different specific vehicle mass value for the trailer and/or the vehicle 200 based on the criteria that the trailer is a lowboy and is empty.

Alternatively, the indication signal may include the mass of the vehicle trailer to be attached to the vehicle tractor. For example, the mass of the vehicle trailer may be measured or estimated and a corresponding mass value may be stored in the signal device 203, the memory 205, or any other component on or in the vehicle trailer. Once the vehicle trailer is attached to the vehicle tractor, the indication signal containing the mass information of the vehicle trailer may be transmitted to the processor 201. The processor 201 may use the mass information to estimate a total mass of the vehicle 200 and to select a desired gear for engagement in a transmission based, at least in part, on the estimated vehicle mass.

Alternatively, the signal device 203 may be an electronic and/or mechanical component operable to monitor a PTO component of the PTO assembly 213. For example, the signal device 203 may be a sensor and/or controller that may continuously or periodically monitor whether a PTO component is engaged in operation. The signal device 203 may transmit a signal to the processor 201 indicating whether or not the PTO component is engaged.

The processor 201 also may determine whether or not a vehicle trailer is attached to a vehicle tractor based on the PTO operation. For example, the PTO component of the PTO assembly 213 may be used to operate a PTO pump or generator in conjunction with the vehicle trailer. During the occurrence of the PTO operation, the signal device 203 may periodically or continuously monitor the PTO component and transmit a PTO message signal to the processor 201. Based on the presence or absence of the PTO message signal, the processor 201 may determine whether or not a vehicle trailer is attached to the vehicle tractor. The processor 201 may retrieve a predetermined value of the mass of the vehicle trailer or the vehicle 200 from the memory 205 as previously described. The predetermined value of the mass may be used to estimate a total mass of the vehicle 200. A desired gear ratio may be selected for engagement in a transmission based, at least in part, on the estimated vehicle mass.

However, a PTO operation may occur even when a vehicle trailer may not be attached to a vehicle tractor. In this situation, additional information may be transmitted in the PTO message signal or another signal alerting the system that a vehicle trailer is not attached. Alternatively, a manual input may be used to indicate the difference between a PTO operation using a vehicle trailer and a PTO operation without a vehicle trailer.

Also, the PTO message signal may be used to calculate a time period of the PTO operation. For example, the PTO component may be used to drive a PTO pump that pumps fluid into and out of a vehicle trailer. As the fluid is being pumped, the processor 201 may continuously or periodically receive the PTO message signal indicating that a vehicle trailer is attached to the vehicle tractor, and based on the reception of the PTO message signal, the processor 201 may estimate the amount of time the PTO operation has been occurring.

Based on the operation time period as well as payload data (e.g., type of payload, density of payload material), the processor 201 may determine a change in the mass of the vehicle trailer. For example, the material and other information of the payload, such as density and/or volume, or dimensional characteristics of the PTO pump may be stored in the memory 205 or may be coded or entered into the vehicle mass estimation system. As time passes, the processor 201 may determine the volumetric flow rate of the liquid being pumped in and/or out of the vehicle trailer. The processor 201 may determine the amount of liquid entering or exiting the vehicle trailer based on pump or PTO component characteristics (e.g., features such as area, volume, or power) and/or information related to the payload (e.g., density, volume, quantity) in relation to a time of operation. Alternatively, the PTO message signal itself may include information indicative of the time of the PTO operation and/or the payload material or amount entry and exit rates. Based on the amount of liquid removed from the vehicle trailer and the material information of the payload, the processor 201 may determine the change in mass of the vehicle trailer. The processor 201 may estimate a vehicle mass based, at least in part, on the change in mass and select a desired gear ratio for engagement in a transmission based, at least in part, on the estimated vehicle mass.

As previously mentioned, the vehicle estimation system may also include the weighing device 217. The weighing device 217 may be one or more strain gauges, weight sensors, pressure or temperature sensors, or any other known or future weighing device located on a suspension, in a wheel, or any other part of the vehicle 200. The weighing device 217 may be operable to measure a mass of at least a portion of the vehicle 200. The weighing device 217 may transmit a mass signal indicative of a mass of at least the portion of the vehicle to the processor 201.

The mass information determined by the weighing device 217 as well as other mass information derived from force/acceleration calculations may be used with any other vehicle mass estimation technique previously described. For example, the processor 201 may use the mass information to select a desired gear ratio for engagement in a transmission in conjunction with the estimation techniques. Alternatively, the mass estimated by the techniques previously described may be replaced or confirmed by the mass determined by the weighing device 217 and/or force/acceleration calculations or vice versa.

Any measured or estimated mass may be displayed on the display 221. The display 221 may be any mechanical and/or electronic display positioned for accessible viewing by a driver, operator, and/or passenger of the vehicle 200. For example, the display 221 may be a light emitting diode, ("LED"), display, liquid crystal display, ("LCD"), or a cathode ray tube ("CRT") display, or any other known or future display in the cab of the vehicle tractor or at any other location in or on the vehicle 200. The display 221 may be capable of showing or illuminating various measurements or estimations including mass values of all or some of the vehicle 200.

Figure 3:
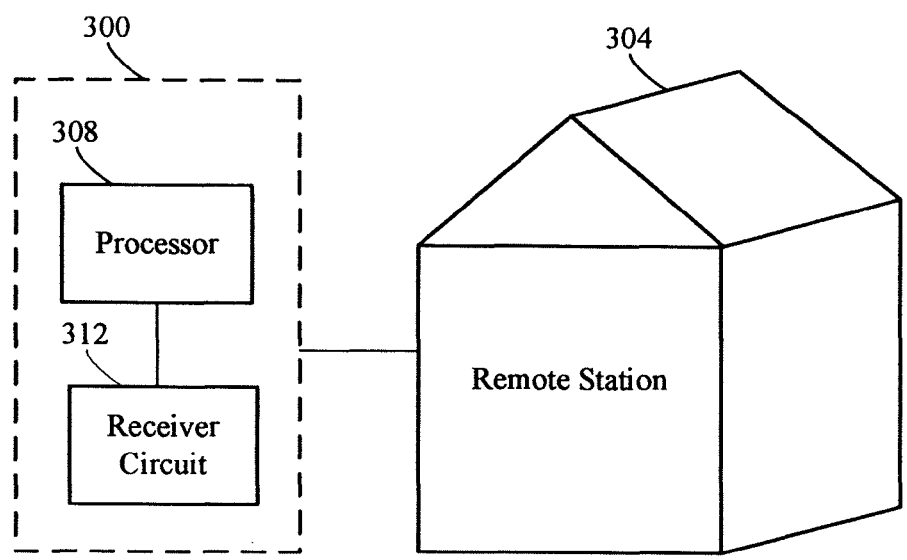
FIG. 3 is a diagram illustrating an alternate exemplary embodiment of a vehicle mass estimation system.

FIG. 3 is a diagram illustrating an alternate exemplary embodiment of a vehicle mass estimation system. The vehicle mass estimation system of FIG. 3 may include a vehicle 300, such as the vehicle 100 or 200 previously described, and the vehicle 300 may be operable to communicate with a remote station 304. A processor 308 and a receiver circuit 312 may be on or in the vehicle 300. The processor 308 may be substantially similar to the processor 201. More components, such as the transmission system 209, the power take-off assembly 213, the memory 205, the signal device 203, the weighing device 217, and the display 221 of FIG. 2, may be included in or on the vehicle 300. Alternatively, fewer components may be utilized. For example, the vehicle mass estimation system may not include the receiver circuit 312.

The remote station 304 may be an area, a scale, an unmanned structure, a manned structure, and/or any known or future facility to measure or estimate a mass of a vehicle, such as the vehicle 300. The remote station 304 may be located by a loading dock of a shipping company, retailer, and/or manufacturer, or it may be located on the premises of a vehicle company that designs, tests, repairs, and/or manufactures vehicles, such as trucks. Alternatively, the remote station may be located on public highways, weigh stations, and/or rest areas.

The remote station 304 may include an area for all or part of a vehicle to be weighed, such as a scale. For example, the vehicle 300, including a vehicle tractor and a vehicle trailer, may park on top of the scale, and the scale may measure the mass of the vehicle 300. Alternatively, the vehicle tractor and/or the vehicle trailer may be weighed separately.

The weight measurement may be stored in a memory of the remote station 304 and may be transmitted to the processor 308 by a wired or wireless transmission. For example, a cable or wire may be connected to the vehicle 300 during, before, or after the weighing of the vehicle 300. The wire connection may be any known or future connection, such as plug or jack connection. The cable or wire connection may be made on the vehicle trailer and/or the vehicle tractor.

Alternatively, a wireless communication may be utilized. For example, after the mass of the vehicle 300 is measured, the remote station 304 may wirelessly transmit the mass information via a mass signal to the vehicle 300. For example, the mass signal may be a radio frequency ("RF") signal, an infrared ("IR") signal, a Wi-Fi signal, a Bluetooth signal, and/or any other known or future wireless signal.

The mass signal may be received by the receiver circuit 312 on or in the vehicle 300. The receiver circuit 312 may include an optical sensor or any other wireless sensor and/or an antenna. Also, the receiver circuit 312 may include electrical components, such as resistors, capacitors, inductors, filters, and/or power amplifiers. Such components may be discrete components on a circuit board or may be integrated on or in a semiconductor device. Portions or all of the receiver circuit 312 may be manufactured as an integrated circuit ("IC") module.

The receiver circuit 312 may receive the mass signal from the remote station 304 and transmit the mass signal or a portion of the signal including the mass information to the processor 308. For example, the receiver circuit 312 may receive the mass signal and amplify the mass signal via a power amplifier. The amplified signal may then be converted into a digital signal via an analog-to-digital converter ("ADC"). The digital signal may include one or more data indicative of the mass of the portion of the vehicle 300 that was weighed. The digital signal may then be transmitted to the processor 308.

Regardless of whether the mass information is received via a wired or wireless communication, the processor 308 may use the mass information in a shifting logic or algorithm to select a desired gear ratio for engagement in a transmission. For example, the measured mass information may be used to select a desired gear ratio for engagement in a transmission in conjunction with the estimation techniques previously discussed. Alternatively, the mass measured by the remote station 304 may replace or confirm any of the mass values estimated by the techniques previously discussed or vice versa.

As previously mentioned, the vehicle 300 or a portion of the vehicle 300 may be weighed in a resting state. However, using a wireless transmission, the remote station 304 may weigh the vehicle 300 or a portion of the vehicle 300 while the vehicle 300 is in motion. For example, the vehicle 300 may pass by or through the remote station 304. The remote station 304 may make a mass measurement of all or part of the vehicle 300 during this time and then transmit the mass information to the vehicle 300 in substantially real time or at a delayed time. Velocity sensors and/or calculations may be used by the remote station 304 to determine accurate mass information of the passing vehicle.

Figure 4:
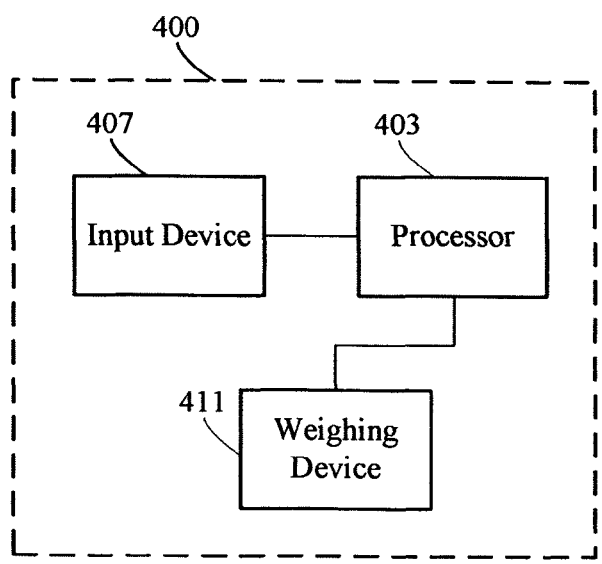
FIG. 4 is a diagram illustrating another alternate exemplary embodiment of a vehicle mass estimation system.

FIG. 4 is a diagram illustrating another alternate exemplary embodiment of a vehicle mass estimation system. The vehicle mass estimation system of FIG. 4 may include a vehicle 400, such as the vehicle 100, 200, or 300 previously described. A processor 403, an input device 407, and a weighing device 411 may be on or in the vehicle 400. The processor 403 may be substantially similar to the processor 201 or 308, and the weighing device 411 may be substantially similar to the weighing device 217. The vehicle 400 also may include other components, such as the transmission system 209, the power take-off assembly 213, the memory 205, the signal device 203, and the display 221 of FIG. 2.

The input device 407 may be any mechanical and/or electrical device enabling an operator or passenger of the vehicle 400 to enter mass information for all or a portion of the vehicle 400. For example, the input device 407 may be a mechanical and/or electrical switch, such as a button or a lever, on or in the vehicle tractor and/or the vehicle trailer. An operator of the vehicle 400 may activate the switch a number of times to indicate a specific mass value. The number of activations may correspond to the mass of the vehicle 400 including both the vehicle tractor and the vehicle trailer. For example, if a vehicle trailer is attached to the vehicle tractor and the operator knows that the vehicle trailer is 9,000 kg, then the operator may push a button nine times or pull a lever nine times. Each time the button is pushed or the lever is pulled, a signal may be generated and transmitted to the processor 403 or an intermediate component, such as a counter. Alternatively, the input device 407 may transmit a signal indicative of the number of activations after all of the activations have been made.

Alternatively, the input device 407 may be a keyboard or a voice recognition circuit in or on the vehicle 400. The keyboard may be a pad having a plurality of buttons or a touch screen. The operator may input the mass of all or part of the vehicle 400 using the keyboard. Also, the voice recognition circuit may be any known or future voice recognition circuit used to extract one or more data from an audible signal. The voice recognition circuit may include electrical components, such as resistors, capacitors, inductors, filters, power amplifiers, ADC's, and/or beamformers. Such components may be discrete components on a circuit board or may be integrated on or in a semiconductor device. Portions or all of the voice recognition circuit may be manufactured as an integrated circuit ("IC") or module.

An operator may verbally recite the mass of the vehicle as an audible signal. The audible signal may be received by the voice recognition circuit via a microphone, a plurality of microphones, or any other known or future audible signal receiver. The audible signal may be sampled and converted into a digital signal by an ADC. The digital signal may be indicative of the mass of the vehicle 400 and may be transmitted to the processor 403. The processor 403 may interpret the digital signal to acquire mass information, such as processing text data from the speech to obtain a mass value. Various voice encryption and security features may be utilized to allow for certain operators to use the voice recognition circuit.

The processor 403 may use the mass information obtained from the input device 407 in a shifting logic or algorithm to select a desired gear ratio for engagement in a transmission. For example, the inputted mass information may be used to select a desired gear ratio for engagement in a transmission in conjunction with the estimation techniques previously discussed. Alternatively, the inputted mass information may replace or confirm any of the mass values estimated by the techniques previously discussed or vice versa.

The weighing device 411 and/or force/acceleration calculations may also be used in conjunction with the input device 407. For example, the weighing device 411 may determine the mass of the vehicle trailer or the whole vehicle 400, such as the weighing device 217. The mass information measured by the weighing device 411 may replace or confirm the mass information generated by the input device and/or any of the estimation techniques previously discussed or vice versa.

Figure 5:
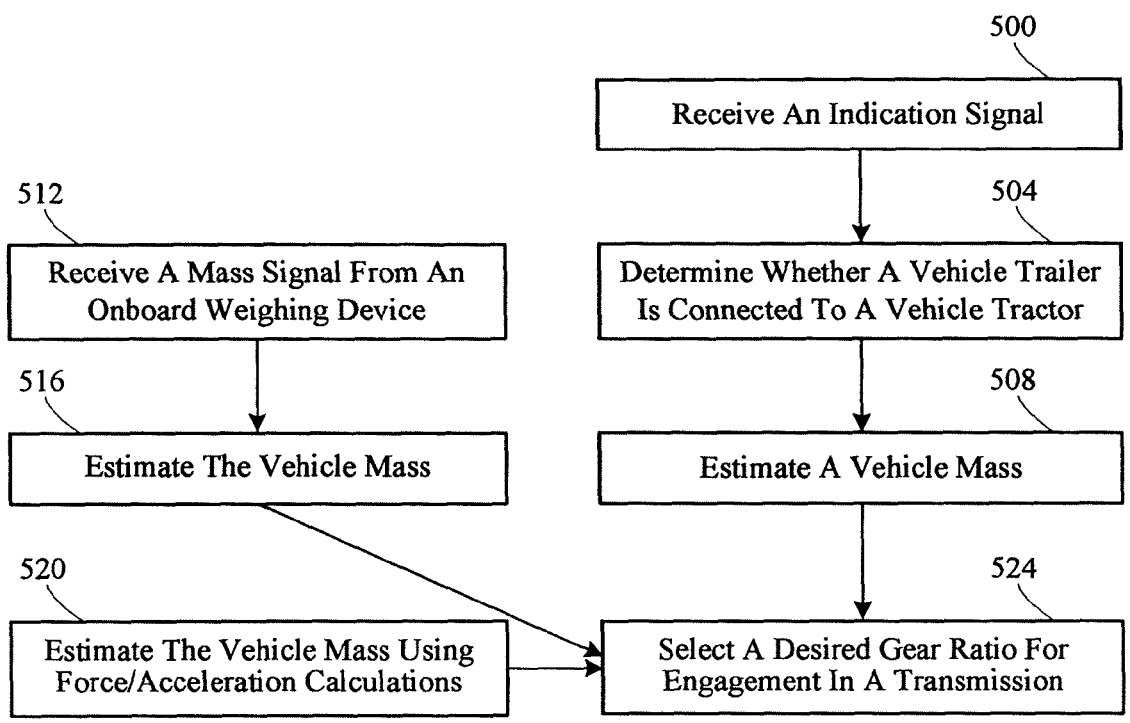
FIG. 5 is a flowchart illustrating an example of a method of estimating a vehicle mass.

FIG. 5 is a flowchart illustrating an example of a method of estimating a vehicle mass. Fewer or more steps may be provided, and the steps may be arranged in different orders. In step 500, an indication signal may be received. For example, the indication signal may indicate that a vehicle trailer is attached to a vehicle tractor. The indication signal may be a low or high AC or DC signal and/or a MID137 signal. Alternatively, the indication signal may be indicative of a type of the vehicle trailer and/or may be indicative of a mass of all or a portion of a vehicle, such as the vehicle trailer. Also, the indication signal may indicate that a PTO operation is occurring and/or indicate a time period of the PTO operation, such as how long the PTO operation has been occurring. The indication signal may also indicate a type and/or amount of payload that may be entering or exiting the vehicle trailer during the PTO operation. In step 504, a determination is made based on the indication signal whether or not a vehicle trailer is connected to a vehicle tractor.

In step 508, a vehicle mass may be estimated based, at least in part, on the indication signal. For example, when an indication signal indicates that a vehicle trailer is present, a predetermined value indicative of the mass of the vehicle trailer or the entire vehicle may be retrieved from a memory to estimate the vehicle mass. The retrieval of the predetermined value may be based on the vehicle trailer type, the type of payload, and/or the amount of payload in or on the vehicle trailer. Alternatively, the indication signal itself may include one or more data indicative of the vehicle trailer mass. Also, a change in mass may be estimated based on how long a PTO operation is occurring and whether a payload is exiting or entering the vehicle trailer due to the PTO operation.

In step 512, a mass signal generated by an onboard weighing device may be received. The mass signal may be indicative of at least a portion of the vehicle, such as the vehicle trailer. The onboard weighing device may be any weighing device previously described.

In step 516, the vehicle mass may be estimated based in part on the mass signal. For example, the mass information from the mass signal may replace or confirm the mass information estimated in step 508 or vice versa.

In step 520, the vehicle mass may be estimated using force and acceleration calculations previously mentioned. The estimated mass based on the force and acceleration calculations may replace or confirm the mass information estimated in steps 508 and 516 or vice versa.

In step 524, a desired gear ratio may be selected for engagement in a transmission based, at least in part, on the estimated vehicle mass. A shifting logic or algorithm may utilize the estimated vehicle mass in selecting the gear ratio by replacing or confirming a previous or simultaneous mass determination.

Figure 6:
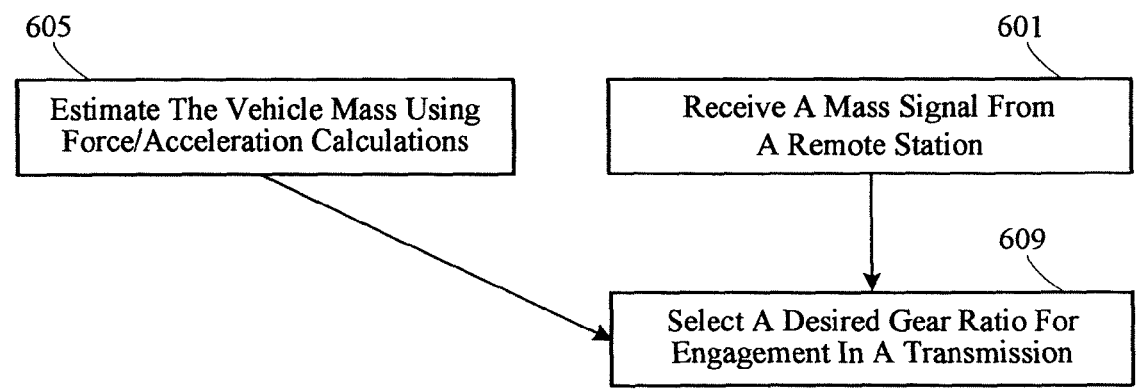
FIG. 6 is a flowchart illustrating an alternate example of a method of estimating a vehicle mass.

FIG. 6 is a flowchart illustrating an alternate example of a method of estimating a vehicle mass. Fewer or more steps may be provided, and the steps may be arranged in different orders. In step 601, a mass signal may be received from a remote station. The remote station may be any remote station previously described. The mass signal may be indicative of a mass of at least a portion of the vehicle. The mass signal may be received wirelessly or via a wired transmission as previously described. Also, the mass signal may be received while the vehicle may be at rest or in motion.

In step 605, the vehicle mass may be estimated using force and acceleration calculations previously mentioned. The estimated mass based on the force and acceleration calculations may replace or confirm the mass information in step 601 or vice versa. Alternatively, any other mass estimation technique may be used, such as utilizing an onboard weighing device and/or an indication signal, as previously mentioned.

In step 609, a desired gear ratio may be selected for engagement in a transmission based, at least in part, on the mass signal from the remote station and/or the estimated vehicle mass. A shifting logic or algorithm may utilize the vehicle mass information in selecting the gear ratio by replacing or confirming a previous or simultaneous mass determination or estimation.

Figure 7:
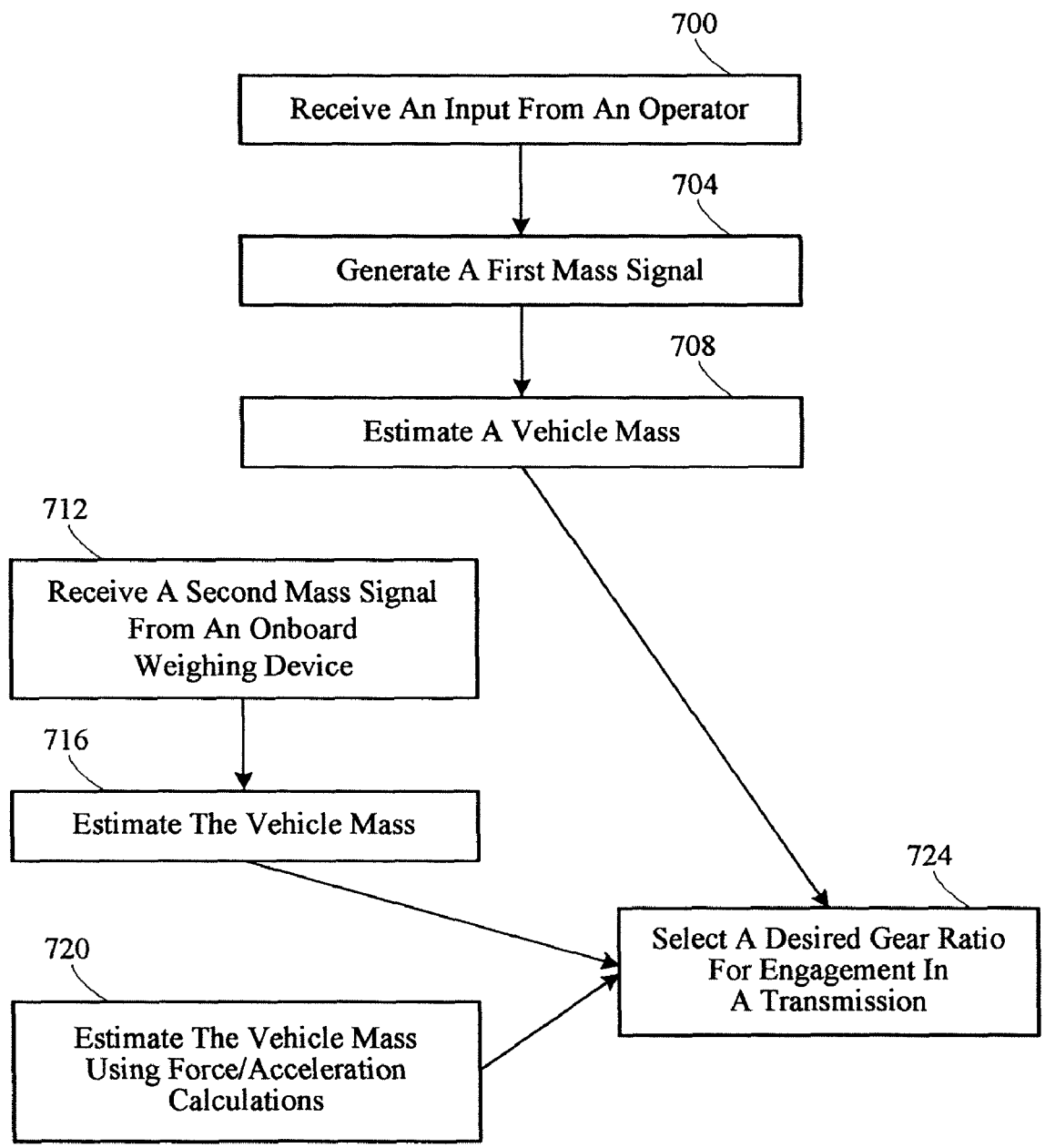
FIG. 7 is a flowchart illustrating another alternate example of a method of estimating a vehicle mass.

FIG. 7 is a flowchart illustrating another alternate example of a method of estimating a vehicle mass. Fewer or more steps may be provided, and the steps may be arranged in different orders. In step 700, an input may be received from an operator. The operator may be a driver, a passenger, or any other person or machine working on or with the vehicle. The input may be activations of a mechanical and/or electrical device. For example, the input may be a switch, such as a button or a lever, and the number of activations of the switch may correspond to a specific mass value of all or a portion of the vehicle.

Alternatively, the input may be a manual entry or an audible signal of the mass of the vehicle. For example, an operator may verbally recite the mass of the vehicle.

In step 704, a first mass signal may be generated based on the input. The first mass signal may be indicative of a mass of at least a portion of the vehicle. For example, a signal may be generated every time an input device, such as the input device 407, is activated, or a signal indicative of the number of activations may be generated. Alternatively, the operator may enter a specific mass using a keyboard, and a signal may be generated based on the entered mass. Also, a voice or audible signal from the operator may be converted into the first mass signal. Any known or future voice recognition technique may be utilized.

In step 708, a vehicle mass may be estimated based, at least in part, on the first mass signal. For example, the mass value entered by the operator may be used as the actual mass of all or a portion of the vehicle, such as a vehicle trailer. The entered value may be an estimation because the input may not exactly correspond to the actual mass. For example, an operator may activate a switch nine times corresponding to 9,000 kg when the actual mass may be 9,400 kg. Alternatively, only a vehicle trailer mass may be entered, and the total mass of the vehicle may be estimated by using any known or future mathematical calculation.

In step 712, a second mass signal generated by an onboard weighing device may be received. The second mass signal may be indicative of at least a portion of the vehicle, such as the vehicle trailer. The onboard weighing device may be any weighing device previously described.

In step 716, the vehicle mass may be estimated based in part on the second mass signal. For example, the mass information from the second mass signal may replace or confirm the mass information estimated in step 708 or vice versa.

In step 720, the vehicle mass may be estimated using force and acceleration calculations previously mentioned. The estimated mass based on the force and acceleration calculations may replace or confirm the mass information in steps 708 and 716 or vice versa. Alternatively, any other mass estimation technique may be used, such as utilizing a remote station and/or an indication signal, as previously mentioned.

In step 724, a desired gear ratio may be selected for engagement in a transmission based, at least in part, on the estimated vehicle mass. A shifting logic or algorithm may utilize the estimated vehicle mass in selecting the gear ratio by replacing or confirming a previous or simultaneous mass determination.

Figure 8:
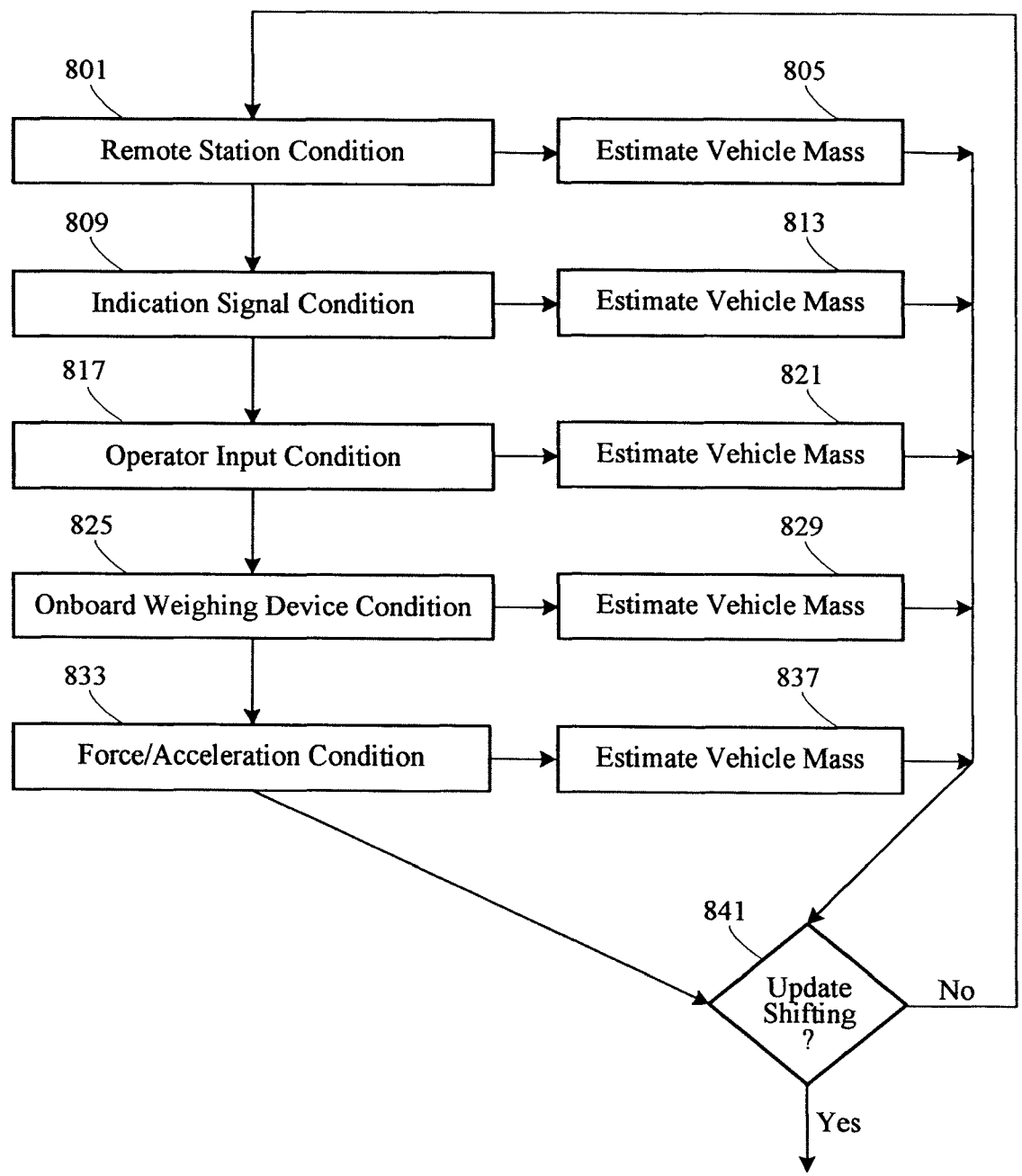
FIG. 8 is a flowchart illustrating an example of a method of updating a vehicle mass estimation.

FIG. 8 is a flowchart illustrating an example of a method of updating a vehicle mass estimation. Fewer or more steps may be provided, and the steps may be arranged in different orders. In step 801, conditions for determining if a remote station may be utilized for estimating a vehicle mass may be determined. For example, the conditions may include, but are not limited to, detection of a mass signal from a remote station, user input or programmed condition, an environmental condition, or any other condition criteria. If the use of a remote station is confirmed by a condition, a vehicle mass is estimated or determined based on the remote station, in step 805, such as previously described in step 601.

In step 809, conditions for determining if an indication signal may be utilized for estimating a vehicle mass may be determined. For example, the conditions may include, but are not limited to, detection of an indication signal, as previously described, user input or programmed condition, an environmental condition, or any other condition criteria. If the use of an indication signal is confirmed by a condition, a vehicle mass is determined based on the indication signal, in step 813, such as previously described in steps 500, 504, and 508.

In step 817, conditions for determining if an operator input may be utilized for estimating a vehicle mass may be determined. For example, the conditions may include, but are not limited to, detection of a mass signal from an input device, as previously described, a programmed setting enabling the system to accept a mass signal from an input device, an environmental condition, or any other condition criteria. If the use of a mass signal from an input device is confirmed by a condition, a vehicle mass is determined based on the mass signal, in step 821, such as previously described in steps 700, 704, and 708.

In step 825, conditions for determining if an onboard weighing device may be utilized for estimating a vehicle mass may be determined. For example, the conditions may include, but are not limited to, detection of a mass signal from an onboard weighing device, as previously described, detection of the onboard weighing device itself, a programmed setting enabling the system to accept a mass signal from an onboard weighing device, an environmental condition, or any other condition criteria. If the use of a mass signal from an onboard weighing device is confirmed by a condition, a vehicle mass is determined based on the mass signal, in step 829, such as previously described in steps 512, 516, 712, and 716.

In step 833, conditions for determining if force and acceleration calculations, as previously mentioned, may be utilized for estimating a vehicle mass may be determined. For example, the conditions may include, but are not limited to, detection of programmed logic or functions to calculate force and acceleration, detection of sensors for supplying information for the calculations, user input or a programmed setting enabling the system to accept force and acceleration calculations, an environmental condition, or any other condition criteria. If the use of force and acceleration calculations are confirmed by a condition, a vehicle mass is determined based on the calculations, in step 837, such as previously described in steps 520, 605, and 720.

In step 841, updating shifting based on an estimated or determined vehicle mass may be determined. For example, if none of the conditions previously mentioned are met, then the system may continue to use the present mass information in the shifting logic for the transmission. However, if a condition is met, then the shifting logic may be updated by updating the present vehicle mass information with a more recent estimated vehicle mass. A priority or hierarchy order may be programmed into the system for choosing a vehicle mass estimation of one method over another. For example, if a condition associated with an indication signal is confirmed as well as a condition associated with a remote station, preprogrammed logic may assign a higher priority to a vehicle mass determination by a remote station. Therefore, the vehicle mass determined by the remote station may be used for selecting a desired gear ratio for engagement in the transmission. The priority logic may be based on the precision of estimation of each of the different techniques, environmental conditions, or any other criteria.

The vehicle mass estimation system previously described may include instructions that may be executable by the processor 201, 308, or 403. The instructions may be stored in a computer-readable medium, such as the memory 205. The instructions may implement the methods, acts, and processes previously described. The instructions for implementing the processes, methods and/or techniques previously discussed may be provided on computer-readable storage media or memories, such as a cache, buffer, RAM, removable media, hard drive or other computer readable storage media. Computer readable storage media may include various types of volatile and nonvolatile storage media. The functions, acts, or tasks illustrated in the figures or described herein may be executed in response to one or more sets of instructions stored in or on computer readable storage media. The functions, acts, or tasks may be independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions may be stored on a removable media device for reading by local or remote systems. In other embodiments, the instructions may be stored in a remote location for transfer through a computer network or over telephone lines. In yet other embodiments, the instructions may be stored within a given computer, CPU, GPU, or system.

Any of the features, steps, processes, or methods previously discussed may be mixed and matched together to create a variety of mass estimation systems and/or methods for a vehicle.

It is intended that the foregoing detailed description be regarded as illustrative rather than limiting, and that it be understood that the following claims, including all equivalents, are intended to define the scope of this invention. The claims may include the phrase "one of A and B" as an alternative expression that means one or more of A or one or more of B.

The invention claimed is:

1. A vehicle mass estimation system for use in a vehicle including a tractor, a trailer, and a transmission, the system comprising:
    a signal device operable to generate an indication signal;
    a processor operable to communicate with the signal device and operable to receive the indication signal from the signal device;
    wherein the processor is further operable to determine whether a vehicle trailer is connected to a vehicle tractor based on the indication signal;
    wherein the processor is further operable to determine at least one of a type of vehicle trailer, a density of payload transported by the vehicle trailer, a volume of payload transported by the vehicle trailer, or a type of payload transported by the vehicle trailer based on the indication signal, if the vehicle trailer is connected to the vehicle tractor;
    wherein the processor is further operable to estimate a vehicle mass based, at least in part, on the at least one of the type of vehicle trailer, the density of payload transported by the vehicle trailer, the volume of payload transported by the vehicle trailer, or the type of payload transported by the vehicle trailer, if the vehicle trailer is connected to the vehicle tractor; and
    wherein the processor is further operable to select a desired gear ratio for engagement in a transmission based, at least in part, on the estimated vehicle mass.

2. The system of claim 1, wherein the signal device comprises a sensor operable to detect contact of the vehicle trailer with the vehicle tractor or an electronic component operable to monitor a power take-off component.

3. The system of claim 1, wherein the indication signal comprises an SAE J 1587 signal.

4. The system of claim 1, wherein determining the type of vehicle trailer comprises determining that a power take-off is operating.

5. The system of claim 4, wherein the processor is further operable to determine a power take-off operation time period based on the indication signal, and wherein the processor is further operable to determine a change in the vehicle mass based on the operation time period and a payload data corresponding to the power take-off operation.

6. The system of claim 1, further comprising:
    a memory operable to store a predetermined value indicative of a vehicle trailer mass;
    wherein the processor is further operable to estimate the vehicle mass based in part on the stored value when the indication signal indicates that the vehicle trailer is connected to the vehicle tractor.

7. The system of claim 1, further comprising:
    a weighing device operable to communicate with the processor and operable to generate a mass signal indicative of a mass of at least a portion of the vehicle,
    wherein the processor is further operable to estimate the vehicle mass based in part on the mass signal.

8. A method of estimating a vehicle mass comprising:
    receiving an indication signal;
    determining whether a vehicle trailer is connected to a vehicle tractor based on the indication signal;
    determining at least one of a type of vehicle trailer, a density of payload transported by the vehicle trailer, a volume of payload transported by the vehicle trailer, or a type of payload transported by the vehicle trailer based on the indication signal, if the vehicle trailer is connected to the vehicle tractor; and
    estimating a vehicle mass based, at least in part, on the at least one of the type of vehicle trailer, the density of payload transported by the vehicle trailer, the volume of payload transported by the vehicle trailer, or the type of payload transported by the vehicle trailer, if the vehicle trailer is connected to the vehicle tractor.

9. The method of claim 8, wherein determining the type of vehicle trailer comprises determining that a power take-off operation is occurring.

10. The method of claim 9, wherein estimating the vehicle mass comprises estimating a change in mass based on a time period of the power take-off operation and a payload.

11. The method of claim 8, wherein receiving the indication signal comprises receiving an SAE J 1587 signal.

12. The method of claim 8, wherein the vehicle mass is estimated based, at least in part, on a predetermined value indicative of a mass of the vehicle trailer.

13. The method of claim 8, further comprising:
    receiving a mass signal from an onboard weighing device, wherein the mass signal is indicative of a mass of at least a portion of the vehicle; and
    estimating the vehicle mass based in part on the mass signal.

14. A vehicle mass estimation system for use in a vehicle including a tractor, a trailer, and a transmission, the system comprising:
    a signal device operable to generate an indication signal;
    a processor operable to communicate with the signal device and operable to receive the indication signal from the signal device;
    wherein the processor is further operable to determine a presence or absence of a vehicle trailer connected to a vehicle tractor based on the indication signal;
    wherein the processor is further operable to estimate a vehicle mass based, at least in part, on the presence or absence of the trailer as indicated by the indication signal; and wherein the processor is further operable to select a desired gear ratio for engagement in a transmission based, at least in part, on the estimated vehicle mass.

15. The system of claim 14, further comprising:

a memory operable to store a first predetermined value indicative of a vehicle tractor mass, and a second predetermined value indicative of a vehicle trailer mass;

wherein the processor is further operable to estimate the vehicle mass based in part on the first predetermined value and the second predetermined value when the indication signal indicates that the vehicle trailer is connected to the vehicle tractor; and wherein the processor is further operable to estimate the vehicle mass based in part on the first predetermined value when the indication signal indicates that the vehicle trailer is not connected to the vehicle tractor.

16. The system of claim 14, wherein the signal device comprises a sensor operable to detect contact of the vehicle trailer with the vehicle tractor or an electronic component operable to monitor a power take-off component.

17. The system of claim 14, wherein the indication signal is indicative of a mass or a type of the vehicle trailer.

18. The system of claim 14, wherein the indication signal comprises an SAE J 1587 signal.

19. The system of claim 14, wherein the indication signal indicates that a power take-off is operating.

20. The system of claim 19, wherein the processor is further operable to determine a power take-off operation time period based on the indication signal, and wherein the processor is further operable to determine a change in the vehicle mass based on the operation time period and a payload data corresponding to the power take-off operation.

* * * * *